(12) United States Patent
Hochberg et al.

(10) Patent No.: US 9,124,154 B2
(45) Date of Patent: Sep. 1, 2015

(54) KINETIC ENERGY CONVERSION DEVICE WITH VARIABLE OUTPUT

(71) Applicant: Dynamic Energy Technologies, LLC, Farmington Hills, MI (US)

(72) Inventors: David J. Hochberg, Oak Park, MI (US); Gregory E. Peterson, Sylvan Lake, MI (US)

(73) Assignee: DYNAMIC ENERGY TECHNOLOGIES, LLC, Farmington Hills, MI (US)

( * ) Notice: Subject to any disclaimer, the term of this patent is extended or adjusted under 35 U.S.C. 154(b) by 4 days.

(21) Appl. No.: 14/189,502

(22) Filed: Feb. 25, 2014

(65) Prior Publication Data

US 2014/0239644 A1    Aug. 28, 2014

Related U.S. Application Data

(60) Provisional application No. 61/768,834, filed on Feb. 25, 2013.

(51) Int. Cl.
| | |
|---|---|
| *F03B 13/00* | (2006.01) |
| *H02P 9/04* | (2006.01) |
| *H02K 7/18* | (2006.01) |
| *H02K 7/06* | (2006.01) |
| *H02K 33/00* | (2006.01) |

(Continued)

(52) U.S. Cl.
CPC ......... *H02K 7/1876* (2013.01); *F05B 2220/707* (2013.01); *H02K 7/06* (2013.01); *H02K 35/02* (2013.01)

(58) Field of Classification Search
USPC ........................... 290/54; 310/23, 24, 80, 171
See application file for complete search history.

(56) References Cited

U.S. PATENT DOCUMENTS

| | | | | |
|---|---|---|---|---|
| 3,609,425 | A | * | 9/1971 | Sheridan ........................ 310/103 |
| 3,636,391 | A | * | 1/1972 | Horner et al. .................... 310/24 |

(Continued)

FOREIGN PATENT DOCUMENTS

| | | |
|---|---|---|
| CN | 101582623 A | 11/2009 |
| ES | 2016497 A6 | 11/1990 |

(Continued)

OTHER PUBLICATIONS

PCT/US2011/047342 International Search Report and Written Opinion of the International Searching Authority dated Mar. 26, 2012.

(Continued)

*Primary Examiner* — Pedro J Cuevas
(74) *Attorney, Agent, or Firm* — Brooks Kushman P.C.

(57) ABSTRACT

A rotational kinetic energy conversion system includes a magnetic piston with an associated winding and an actuating magnet. Relative motion between the actuating magnet and the magnetic piston causes the magnetic piston to induce a current and voltage in the winding creating electrical energy. The amount of electrical energy induced in the winding is varied by adjusting a spacing between the magnetic piston and the actuating magnet. The spacing may be based on a relative speed between the magnetic piston and the actuating magnet. Maximum energy output may be increased by including additional sets of magnetic pistons and actuating magnets. The spacing between each individual set of magnetic pistons and actuating magnets may be changed to control the energy output.

20 Claims, 11 Drawing Sheets

(51) Int. Cl.
*H02K 35/00* (2006.01)
*H02K 35/02* (2006.01)

(56) References Cited

U.S. PATENT DOCUMENTS

| | | | | |
|---|---|---|---|---|
| 3,811,058 A * | 5/1974 | Kiniski | | 310/80 |
| 3,879,622 A * | 4/1975 | Ecklin | | 310/80 |
| 3,899,703 A * | 8/1975 | Kinnison | | 310/103 |
| 3,935,487 A * | 1/1976 | Czerniak | | 310/46 |
| 3,967,146 A * | 6/1976 | Howard | | 310/80 |
| 4,011,477 A | 3/1977 | Scholin | | 310/80 |
| 4,207,773 A * | 6/1980 | Stahovic | | 74/25 |
| 4,300,067 A * | 11/1981 | Schumann | | 310/80 |
| 4,384,221 A * | 5/1983 | Brandly | | 310/24 |
| 4,827,163 A | 5/1989 | Bhate et al. | | 310/15 |
| 5,347,186 A | 9/1994 | Konotchick | | 310/17 |
| 5,440,175 A | 8/1995 | Mayo, Jr. et al. | | 290/54 |
| 5,818,132 A | 10/1998 | Konotchick | | 310/17 |
| 5,886,442 A * | 3/1999 | Ogino et al. | | 310/181 |
| 5,945,762 A * | 8/1999 | Chen et al. | | 310/171 |
| 6,051,902 A * | 4/2000 | Ogino et al. | | 310/154.01 |
| 6,092,531 A * | 7/2000 | Chen et al. | | 128/899 |
| 6,274,959 B1 * | 8/2001 | Uchiyama | | 310/152 |
| 6,281,611 B1 * | 8/2001 | Chen et al. | | 310/171 |
| 6,291,901 B1 | 9/2001 | Cefo | | 290/1 R |
| 6,331,744 B1 * | 12/2001 | Chen et al. | | 310/171 |
| 6,433,452 B1 * | 8/2002 | Graham | | 310/152 |
| 6,552,450 B2 * | 4/2003 | Harty et al. | | 310/16 |
| 6,600,399 B1 | 7/2003 | Trandafir | | 335/222 |
| 6,657,351 B2 * | 12/2003 | Chen et al. | | 310/171 |
| 6,731,035 B2 * | 5/2004 | Mu et al. | | 310/80 |
| 6,833,637 B2 | 12/2004 | Park et al. | | 310/12.01 |
| 6,861,772 B2 | 3/2005 | Cheung et al. | | 310/30 |
| 6,914,351 B2 | 7/2005 | Chertok | | 310/12.26 |
| 7,151,332 B2 | 12/2006 | Kundel | | 310/20 |
| 7,285,868 B2 | 10/2007 | Wilson | | 290/1 R |
| 7,382,106 B2 * | 6/2008 | Kundel | | 318/538 |
| 7,400,069 B2 * | 7/2008 | Kundel | | 310/20 |
| 7,402,929 B1 * | 7/2008 | Dilliner | | 310/152 |
| 7,476,991 B2 * | 1/2009 | Chang | | 310/24 |
| 7,564,153 B2 * | 7/2009 | Ucer | | 310/80 |
| 7,586,220 B2 | 9/2009 | Roberts | | 310/15 |
| 7,687,943 B2 | 3/2010 | Lunde | | 310/15 |
| 7,855,478 B2 | 12/2010 | Wandzilak | | 310/20 |
| 7,902,703 B2 * | 3/2011 | Ucer | | 310/80 |
| 7,911,096 B2 | 3/2011 | Froelich | | 310/80 |
| 8,324,763 B2 * | 12/2012 | Gosvener | | 310/23 |
| 8,344,560 B2 * | 1/2013 | Gosvener | | 310/23 |
| 8,456,032 B2 * | 6/2013 | Hochberg et al. | | 290/54 |
| 8,487,484 B1 * | 7/2013 | Miller et al. | | 310/12.14 |
| 8,508,089 B2 * | 8/2013 | Edwards et al. | | 310/80 |
| 8,593,007 B2 | 11/2013 | Hochberg et al. | | 290/54 |
| 8,664,816 B1 * | 3/2014 | Edwards et al. | | 310/80 |
| 8,786,143 B2 * | 7/2014 | Gosvener | | 310/14 |
| 2001/0045785 A1 * | 11/2001 | Chen et al. | | 310/104 |
| 2007/0267921 A1 * | 11/2007 | McCarthy | | 310/24 |
| 2010/0006362 A1 | 1/2010 | Armstrong | | 180/165 |
| 2010/0193304 A1 * | 8/2010 | Bose et al. | | 188/267.2 |
| 2011/0011079 A1 | 1/2011 | Kamen et al. | | 60/520 |
| 2011/0175463 A1 * | 7/2011 | Ketchersid, Jr. | | 310/15 |
| 2011/0298217 A1 * | 12/2011 | Hochberg et al. | | 290/54 |
| 2012/0061893 A1 | 3/2012 | Hochberg et al. | | 267/195 |
| 2013/0264828 A1 * | 10/2013 | Hochberg et al. | | 290/54 |

FOREIGN PATENT DOCUMENTS

| | | |
|---|---|---|
| JP | 02072233 | 3/1990 |
| JP | 04129815 | 4/1992 |
| JP | 2000152558 A | 5/2000 |
| JP | 200212001 | 4/2002 |
| JP | 2005033917 A | 2/2005 |
| JP | 2006149163 A | 6/2006 |
| JP | 2006296144 A | 10/2006 |
| KR | 1019970034204 | 7/1997 |
| KR | 1019990076756 | 10/1999 |
| KR | 1020090110891 | 10/2009 |

OTHER PUBLICATIONS

PCT/US2011/039448 International Search Report and Written Opinion of the International Searching Authority dated Feb. 9, 2012.
PCT International Search Report dated Nov. 19, 2010 for PCT/US2010/032037.

* cited by examiner

KINETIC ENERGY CONVERSION DEVICE WITH VARIABLE OUTPUT

CROSS-REFERENCE TO RELATED APPLICATIONS

This application claims the benefit of U.S. provisional application Ser. No. 61/768,834 filed Feb. 25, 2013, the disclosure of which is hereby incorporated in its entirety by reference herein.

This application is related to U.S. patent application Ser. No. 13/154,971, filed Jun. 7, 2011, entitled "ROTATIONAL KINETIC ENERGY CONVERSION SYSTEM," which claims the benefit of U.S. Provisional Application Ser. No. 61/352,120, filed Jun. 7, 2010, entitled "ROTATIONAL KINETIC ENERGY CONVERSION SYSTEM", the contents of which are hereby incorporated by reference in their entirety. This application is also related to Provisional Application Ser. No. 61/171,641, filed Apr. 22, 2009, entitled "Kinetic Energy Conversion Device", and to Patent Cooperation Treaty Application Serial Number PCT/US 10132037, filed Apr. 22, 2010, entitled "Energy Conversion Device". All disclosures in these prior applications are incorporated by reference herein.

TECHNICAL FIELD

This disclosure is related generally to energy conversion systems capable of inputting either mechanical energy and/or electrical energy and outputting electrical and/or mechanical energy. In particular, the energy conversion system is adapted for converting one form of input energy selected from a mechanical energy and electrical energy, into an output energy selected from a mechanical energy and electrical energy, using an orbiting magnetic component and a reciprocating magnetic component, where the mechanical energy of the orbiting magnetic component is associated with a moving fluid.

SUMMARY

A rotational kinetic energy conversion system for converting between kinetic energy and electric energy is provided, wherein an orbiting magnetic component interacts cyclically with a reciprocating magnetic component, such as a magnetic piston, to transfer energy there between.

An exemplary system comprises a magnetic piston reciprocable along a first axis, such as a first longitudinal axis, relative to a longitudinal frame, and an actuating magnet orbitable about a second longitudinal axis, to cyclically move towards and away from the magnetic piston. In particular, the magnetic piston may be associated with a fixed longitudinal frame defining the first longitudinal axis and the actuating magnet may be associated with a rotating frame defining and rotating about the second longitudinal axis. The interaction of the magnetic piston and the actuating magnet may be used to translate between reciprocating kinetic energy associated with the motion of the piston and rotational kinetic energy associated with the movement of the rotating frame and the actuating magnet.

The actuating magnet may be mounted to a rotor rotatable about the second longitudinal axis. The rotor may be moved axially relative the second longitudinal axis to selectively vary a spacing distance between the actuating magnet and the magnetic piston for varying an electrical output.

An energy conversion system includes a magnetic piston displaceable along a first path and a winding disposed about the first path. The system further includes an actuating magnet cyclically interacting with the magnetic piston based on relative motion of the actuating magnet with respect to the magnetic piston such that the actuating magnet exerts a force on the magnetic piston to oscillate the magnetic piston along the first path to induce an electrical current and voltage in the winding, thereby creating an amount of electrical energy. The system further includes a control element configured to change a spacing between the magnetic piston and the actuating magnet to vary the force, thereby changing the amount of electrical energy. The spacing between the magnetic piston and the actuating magnet may be a nearest distance between a centerline of the magnetic piston and a centerline of the actuating magnet during relative motion of the actuating magnet with respect to the magnetic piston. The system may further include a rotatable frame that rotates about an axis, wherein the actuating magnet is attached to the rotatable frame and moves in an orbital path about the axis such that the actuating magnet moves relative to the magnetic piston. The control element may move one of the actuating magnet and the rotatable frame axially with respect to the axis to change the spacing between the magnetic piston and the actuating magnet. The control element may move one of the magnetic piston and the actuating magnet radially with respect to the axis to change the spacing between the magnetic piston and the actuating magnet. The control element may move the magnetic piston axially with respect to the axis to change the spacing between the magnetic piston and the actuating magnet. The system may further include a rotatable frame that rotates about an axis, wherein the magnetic piston is attached to the rotatable frame and moves in an orbital path about the axis such that the magnetic piston moves relative to the actuating magnet. The control element may move the magnetic piston radially with respect to the axis to change the spacing between the magnetic piston and the actuating magnet. The control element may change the spacing between the magnetic piston and the actuating magnet based on a relative speed of the actuating magnet with respect to the magnetic piston. The spacing may be increased as the relative speed decreases when the relative speed is less than a predetermined value.

A rotational kinetic energy conversion system includes a linear energy conversion device, a rotatable frame that rotates about an axis, and an actuating magnet attached to the rotatable frame. The actuating magnet rotates in an orbital path to cyclically interact with the linear energy conversion device to cause the linear energy conversion device to create electrical energy. The system further includes a control element to move one of the rotatable frame, the actuating magnet, and the linear energy conversion device to change a spacing between the orbital path and the linear energy conversion device to change an amount of electrical energy created. The linear energy conversion device may include a magnetic piston displaceable along a first path and a winding disposed about the first path. The control element may move one or more of the rotatable frame and the actuating magnet axially with respect to the axis to change the spacing between the orbital path and the linear energy conversion device. The control element may move the linear energy conversion device axially with respect to the axis to change the spacing between the orbital path and the linear energy conversion device. The control element may move one of the linear energy conversion device and the actuating magnet radially with respect to the axis to change the spacing between the orbital path and the linear energy conversion device. The control element may change the spacing between the orbital path and the linear energy conversion device based on a rotational speed of the actuating magnet. The rotatable frame may further include a plurality of fluid resisting devices such that the rotatable frame is driven to rotate about the axis by motion of a fluid.

A method of converting rotational energy into electrical energy includes driving an actuating magnet to move in an orbital path relative to a magnetic piston to cyclically exert a force on the magnetic piston, thereby inducing an electrical current in a winding disposed about a path of the magnetic piston to create electrical energy. The method further includes changing a spacing between the orbital path and the magnetic piston to adjust an amount of electrical energy. The spacing may be increased as a relative speed between the actuating magnet and the magnetic piston decreases. The spacing may be changed by moving one of the actuating magnet and the magnetic piston.

BRIEF DESCRIPTION OF THE DRAWINGS

Some configurations of the energy conversion device will now be described, by way of example only and without disclaimer of other configurations, with reference to the accompanying drawings, in which:

DETAILED DESCRIPTION

Figure 1:
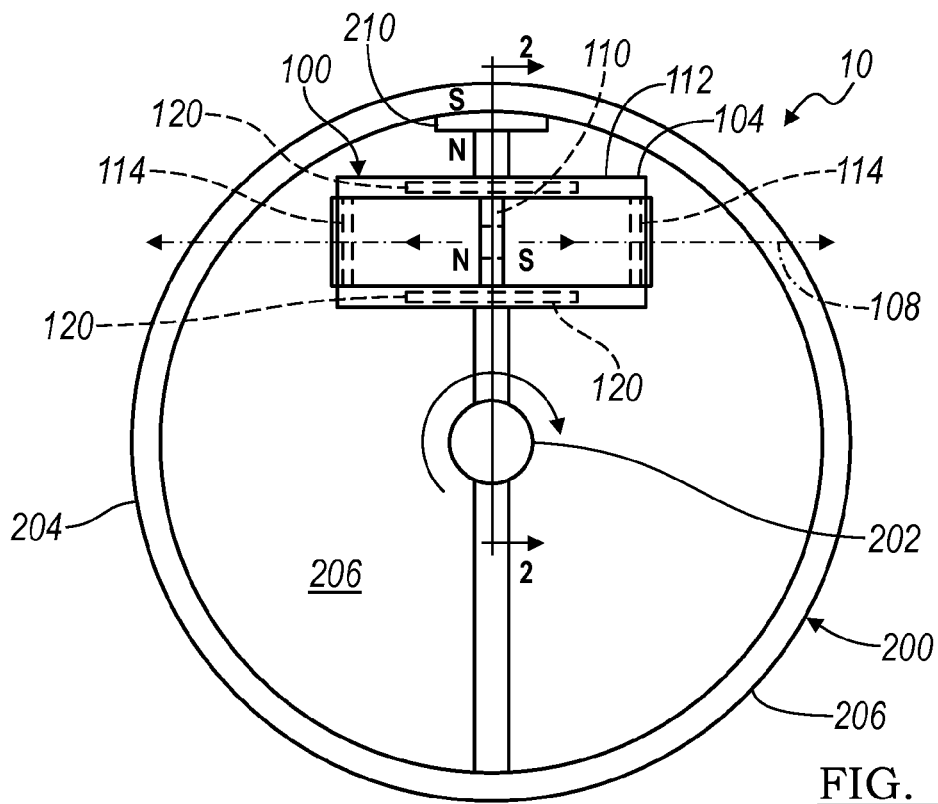
FIG. 1 is a schematic representation of an exemplary rotational kinetic energy conversion system.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring now to the drawings, exemplary energy conversion devices with variable output are illustrated. Although the drawings represent alternative configurations of energy conversion devices, the drawings are not necessarily to scale and certain features may be exaggerated to provide a better illustration and explanation of a configuration. The configurations described herein are not intended to be exhaustive or to otherwise limit the device to the precise forms disclosed in the following detailed description.

Figure 2:
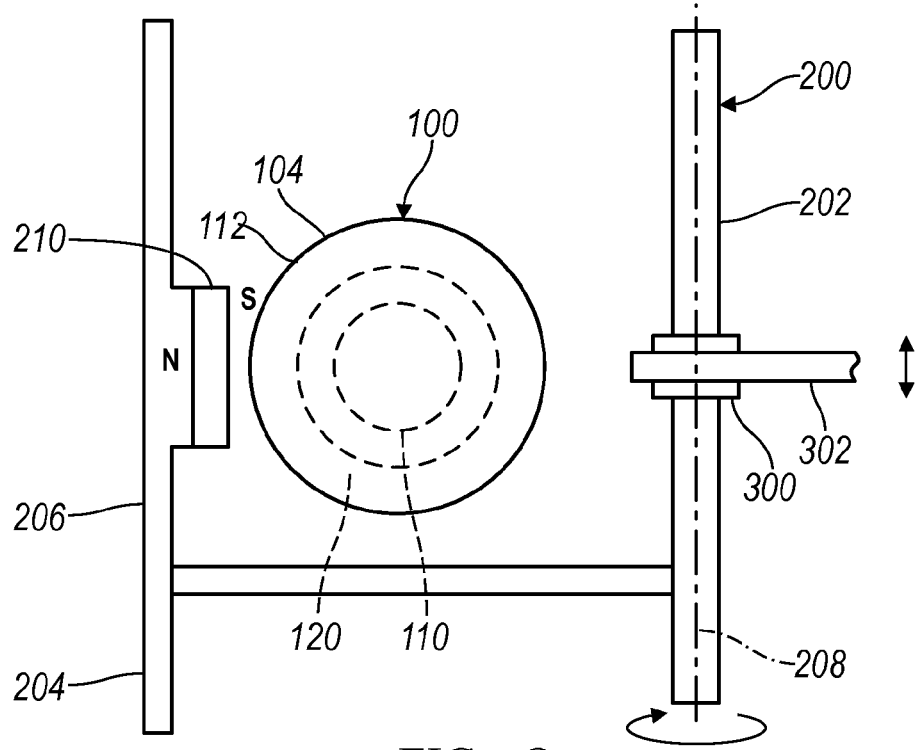
FIG. 2 is a partial sectional view of a rotational kinetic energy conversion system taken along section line 2-2 of FIG. 1.

Referring to FIGS. 1 and 2 schematically illustrating an exemplary rotational kinetic energy conversion system 10 capable of variable output. The rotational kinetic energy conversion system 10 includes an exemplary linear kinetic energy conversion device 100 and an exemplary rotational kinetic energy conversion device 200. Although illustrated as including a single energy conversion device 100, energy conversion system 10 may employ multiple energy conversion devices 100, as may be required by the performance and design requirements of a particular application. The linear kinetic energy conversion device 100 may further include a fixed frame 104, defining a first longitudinal axis 108 (see FIG. 1). A complex magnetic piston 110 is constrained by mechanical and/or magnetic means, to be reciprocable along first longitudinal axis 108 about a neutral center position in which it is illustrated. Fixed frame 104 may include a housing 112 surrounding the piston 110, as well as axial end magnets 114 and/or radial side magnets capable of interacting with the piston 110 to position the piston 110 within the housing 112. Fixed frame 104 may be provided with a coil or toroidal winding 120 capable of interacting with complex magnetic piston 110 to generate an electrical current in the winding in response to oscillation of the magnetic piston along first longitudinal axis 108.

Rotational kinetic energy conversion device 200 has a rotatable frame 204 mounted, for example to a shaft 202 defining a second longitudinal axis 208 (see FIG. 2) about which rotatable frame-204 is constrained to rotate. The rotatable frame 204 may be powered, for example, by hydro, wind or solar energy, or any other kinetic energy source. Hydro power may be harnessed by using river current or the wave action of lakes and oceans. Wind power may be harnessed, for example, by using propellers or blades, or cups, such as illustrated variously in FIGS. 11 and 12.

The rotatable frame 204 may include one or more generally cylindrically shaped rotors 206, which may be located adjacent the linear kinetic energy conversion device 100. One or more actuating magnets 210 are fixed to portions of the rotor 206 remote from the second longitudinal axis 208, and define a circular orbital path about longitudinal axis 208 generally coinciding with an inner circumference of rotor 206 when the rotatable frame 204 is rotated about longitudinal axis 208. Rotor 206 is movable axially relative to longitudinal axis 208 for selectively controlling the spacing between actuating magnet 210 and piston 110 (see FIGS. 6, 8 and 10), which effects the rate of movement of piston 110 within housing 112 and thus the energy output of energy conversion device 10.

Although illustrated as including a single actuating magnet 210, additional actuating magnets may be provided at different angular positions about the second longitudinal axis to also selectively interact with the piston 110. The multiple actuating magnets may be arranged within a common plane and generally equally spaced along rotor 206. Employing multiple uniformly spaced actuating magnets 210 provides a balanced force on the piston 110 and may reduce undesirable vibration of rotor 206. It will be appreciated that the components may be scaled dimensionally and in magnetic strength and weight so as to provide a smooth reciprocation or oscillation of the piston 110 for the expected range of rotational speeds of the rotatable frame 204. The oscillation frequency of the piston 110 may be the same or greater than the rotational frequency of the magnet 210.

Rotatable frame 204 may be rotated by a moving fluid, such as air or water, by the use of vanes, or similar devices, so as to capture the kinetic energy of the moving fluid. It will further be appreciated that the fixed frame 104 may be fixed in position relative to the second longitudinal axis 208 and the rotatable frame 204 by any convenient means. The support structure for devices 100 and 200 has been omitted from FIGS. 1 and 2 to provide clearer visibility of the components of these devices.

In use, as the rotatable frame 204 rotates, the actuating magnets 210 orbit the second longitudinal axis 208 into and out of the range of the complex magnetic piston 110 to cyclically interact with the complex magnetic piston and cause the oscillation of the piston 110 relative to the fixed frame 104. This oscillation of the piston 110 generates a current in the toroidal winding 120, thereby permitting the rotational kinetic energy conversion system 10 to convert the kinetic energy of a moving fluid to rotational kinetic energy of the rotatable frame 204, then into linear kinetic energy of the piston 110, and finally into electrical power in the form of electric current through the toroidal winding 120.

The complex magnet piston 110 may be manufactured or selected so as to have an axial magnetic component and/or a radial magnetic component. The axial magnetic component may interact with axial end magnets 114 to limit the movement of the piston 110 and to accelerate the piston 110 to return to the neutral central position in the fixed frame 104, while the radial magnetic component may interact with the toroidal winding 120 to generate electrical current. The axial magnetic component is also used to interact with actuating magnets 210. The radial magnetic component may also interact with radial side magnets to help position the piston and reduce friction.

The actuating magnets 210 may be selected and oriented, as illustrated in FIG. 1, so as to effectively present a face of either identical or opposite polarity to the radial magnetic component of the piston 110 as the actuating magnets 210 approach the piston and to effectively present a face of either identical or opposite polarity to the radial magnetic component of the piston 110 as the actuating magnets 210 pass and retreat from the piston along their orbital paths. For example, as the actuating magnet 210 moves towards the piston 110, the interacting faces of the piston 110 and actuating magnet 210 repel each other, causing the actuating magnet 210 to impart a biasing force on the piston 110 tending to move the piston towards an end magnet. When the actuating magnet 210 passes the piston 110, the opposite faces of the piston 110 and actuating magnet 210 begin interacting and the piston 110 is pushed in an opposite direction. The end magnets 114 also act on the piston to slow and eventually reverse its direction of motion.

It will be appreciated that either identical or opposing polarities may be utilized in the above described configurations for many applications such that magnet 210 attracts the piston 110 and accelerates it towards the axial end magnet, provided that each of the polarities are selected so that the forces balance to produce the desired action of the piston 110.

Figure 3:
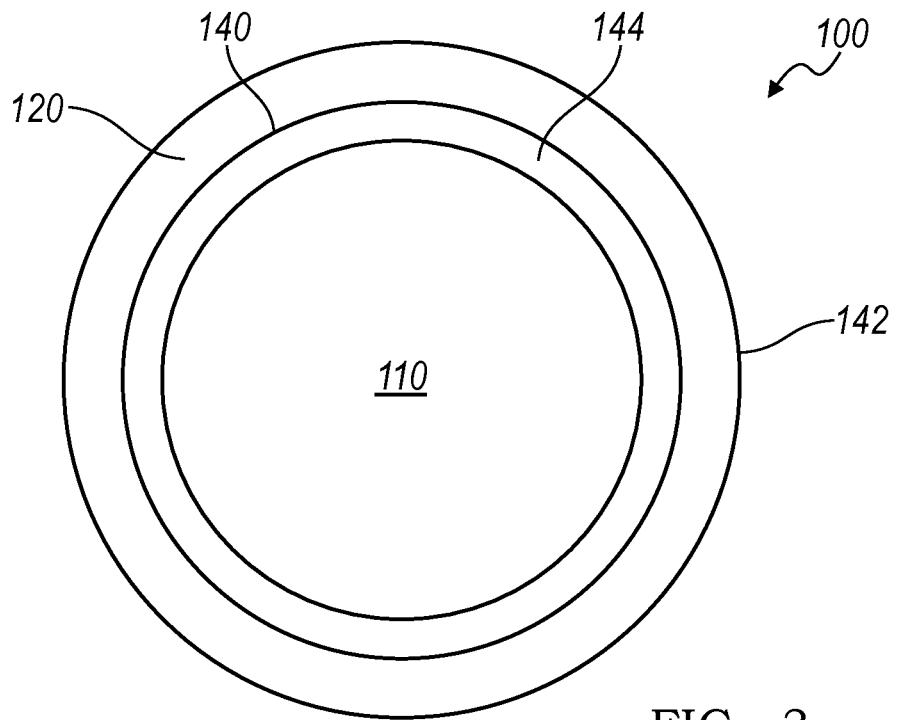
FIG. 3 is a sectional end view of a linear kinetic energy conversion device taken along section line 3-3 of FIG. 5.
Figure 4:
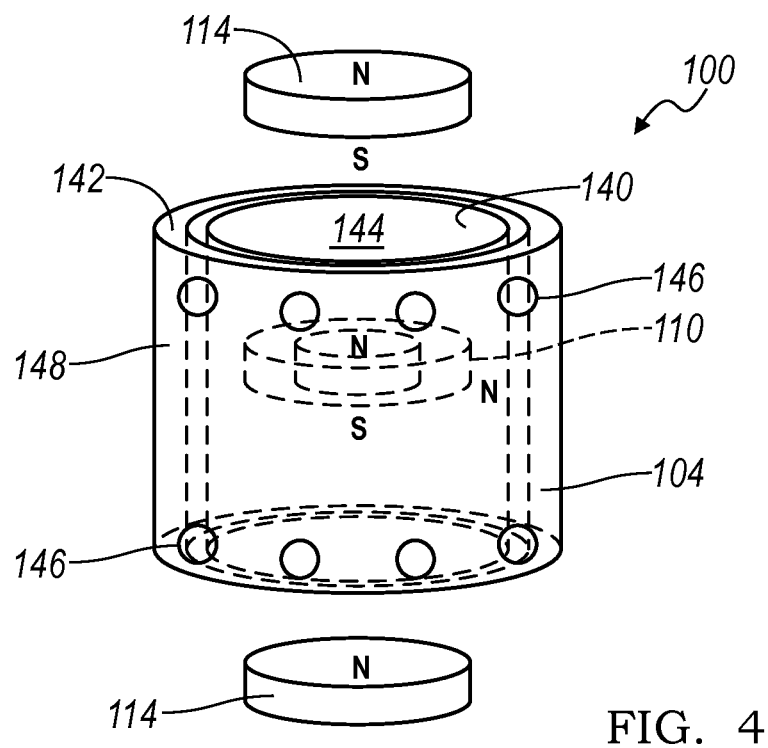
FIG. 4 is an exploded view of the linear kinetic energy conversion device of FIGS. 3 and 5.
Figure 5:
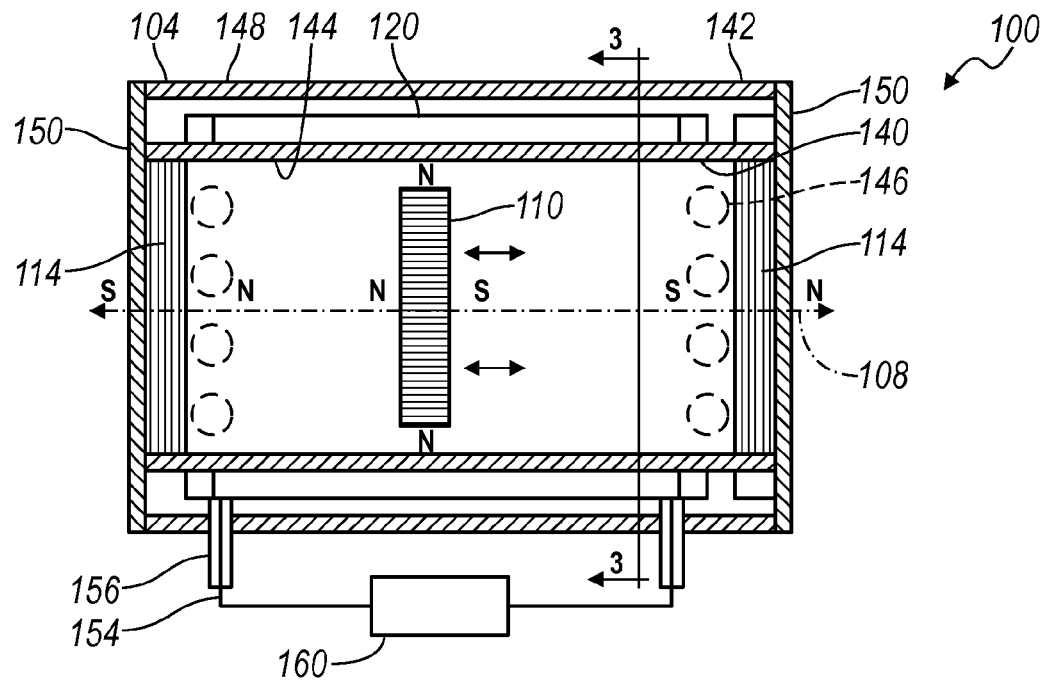
FIG. 5 is a side sectional view of an the linear kinetic energy conversion device that may be employed with the rotational kinetic energy conversion device of FIGS. 1 and 2.

An example of one possible configuration of the linear kinetic energy conversion device 100 is shown in FIGS. 3 through 5. Fixed frame 104 of device 100 may include a tube or inner housing 140 formed of a suitable non-conductive material, such as plastic, supporting a toroidal winding 120 there around and a pair of axial end magnets 114 at each end of the inner housing 140.

The inner housing 140 defines a channel 144 for the piston 110. The toroidal winding 120 may be sized as shown to extend only partially towards the ends of inner housing 140 to provide a gap of more than the thickness of the piston 110 so that the field is broken as the piston approaches the end magnets 114, causing an electrical spike in the current generated in the toroidal winding 120. Alternatively, the toroidal winding 120 may be sized to extend sufficiently close to the ends of inner housing 140, such that the piston 110 does not completely exit the toroidal winding 120 and at least a portion of the piston 110 is positioned within the toroidal winding at a given instance.

Fixed frame 104 may further include an outer housing 142 enclosing the inner housing 140, the toroidal winding 120 and the end magnets 114. The outer housing 142 may include a cylindrical wall 148 closed at each end by a wall 150 (see FIG. 5) to form an enclosure for the magnetic components of kinetic energy conversion device 100. Axial end magnets 114 may be affixed to or abut walls 150. It should be noted that in FIGS. 3-5, piston 110 is shown spaced away from inner housing 140 so as to avoid loss of energy to friction between components. Piston 110, however, may be proportioned with a sufficiently large diameter relative to the inner diameter of toroidal winding 120 to restrict airflow between the sides of piston 110. To prevent air pressure buildup on either side of piston 110 from inhibiting movement of piston 120, housing 112 may be provided with openings 146 (see FIGS. 4 and 5) permitting airflow to the respective sides of the piston 110.

Linear energy conversion device 100 may be configured to provide either alternating current or direct current output. Wires 154 from the windings 120 may extend through apertures 156 through the outer housing 142 to connect to an electrical load 160. The electrical load 160 may be one or more electrical devices capable of consuming the power, one or more storage devices used to store power for later use, or a power distribution system. Exemplary storage devices for electrical load 160 include batteries, flywheels, capacitors, and other devices of capable of storing energy using electrical, chemical, thermal or mechanical storage systems. Exemplary electrical devices for electrical load 160 include electric motors, fuel cells, hydrolysis conversion devices, battery charging devices, lights, and heating elements. Exemplary power distribution system electrical load 160 includes a residential circuit breaker panel, or an electrical power grid. Electrical load 160 may also include an intermediate electrical power conversion device or devices capable of converting the power to a form useable by electrical load 160 such as an inverter.

Outer housing 142 may be provided with appropriate legs or mounting points for selectively mounting the linear kinetic energy conversion device 100 to a stationary structure, such as a tower for an airfoil based rotating wheel.

It should be noted that exemplary linear energy conversion device 100 does not include a radial magnetic source, as their use is optional depending on the application.

The energy output from kinetic energy conversion system 10 may be affected by the speed at which piston 110 travels past toroidal winding 120 and the magnitude of the biasing force exerted between piston 110 and actuating magnet 210. The piston speed is linearly related to frequency, and in accordance with Faradays law, electrical power is directly proportional to frequency. Changes in either parameter will have an effect on the energy output from kinetic energy conversion device 10. For example, increasing the spacing between actuating magnet 210 and piston 110 tends to reduce the biasing force exerted on piston 110 as actuating magnet 210 passes by the piston 110. This in turn reduces the velocity at which piston 110 travels past toroidal winding 120, thereby causing a corresponding drop in electrical current output from the kinetic energy conversion device 10.

Figure 6:
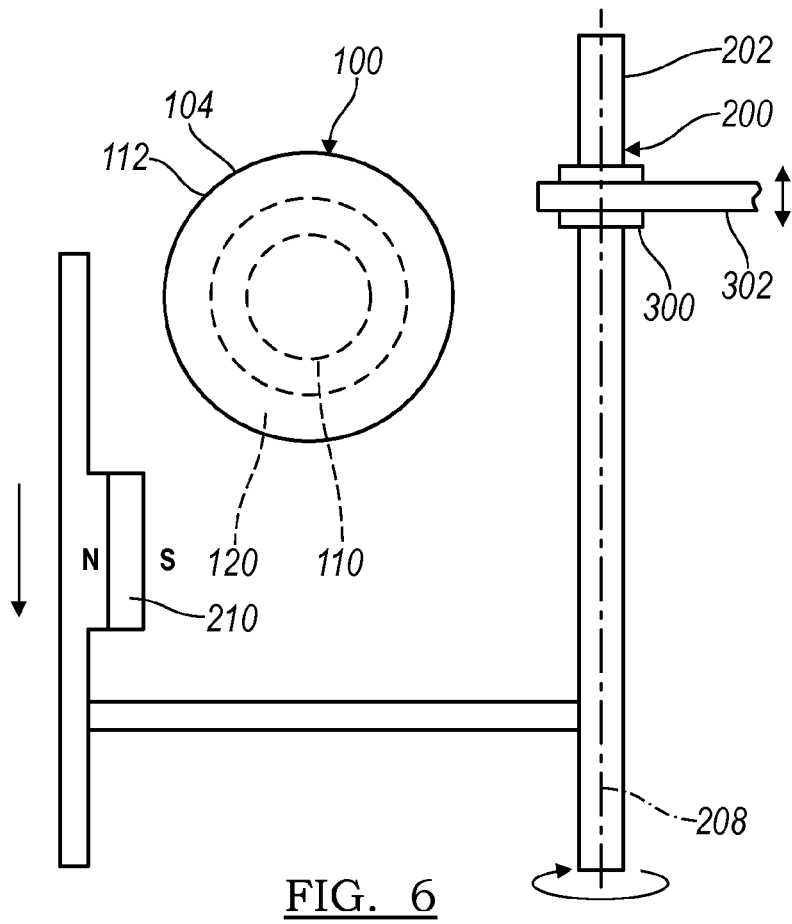
FIG. 6 is a partial sectional view of the rotational kinetic energy conversion with an actuating magnet positioned at a distance removed from the linear kinetic energy conversion device.

With reference to FIGS. 2 and 6, kinetic energy conversion device may include a control element for selectively moving actuating magnet 210 towards and away from the region of piston 110 for controlling the electrical energy output from linear energy conversion device 100. For example, actuating magnet 210 is illustrated in FIG. 2 positioned adjacent the linear energy conversion device 100. This position will result in actuating magnet 210 exerting a maximum biasing force on piston 110 as the actuating magnet 210 passes by the linear energy conversion device 100. The electrical energy output from linear energy conversion device 210 may be selectively reduced by increasing the spacing between actuating magnet 210 and linear energy conversion device 100. For example, positioning actuating magnet 210 at a further location from linear energy conversion device 100, such as illustrated in FIG. 6, decreases the biasing force exerted by actuating magnet 210 on piston 110, and thus, the electrical energy output from the linear energy conversion device 100. Linear energy conversion device 100 will generally produce a higher electrical output with actuating magnet 210 positioned in the location shown in FIG. 2 than with the actuation magnet 210 positioned as shown in FIG. 6.

Various control elements or mechanisms may be provided for selectively adjusting the position of actuating magnet 210 relative to linear energy conversion device 100 and piston 110. For example, a control element may be provided for selectively moving rotor 206 and attached actuating magnet 210 axially relative to longitudinal axis 208. The control element may be hydraulically, pneumatically and electrically actuated, or any combination thereof. Sensors may be employed for detecting and monitoring the location of actuating magnet 210 relative to linear energy conversion device 100, and monitoring the electrical output from linear energy conversion device 100. One or more control modules may be employed to analyze signals received from the sensors and formulate a control strategy for moving and positioning actuating magnet 210 relative to linear energy conversion device 100. One possible control element may utilize a hub 300 and a shift fork 302. The hub 300 may be attached to the shaft 202 and rotate with the shaft 202. A shift fork 302 may engage the hub 300 and as the shift fork 302 is moved in an axial direction, the shaft 202 and rotor 206 will move axially as well. The shift fork 302 may be controlled hydraulically, pneumatically and electrically actuated, or any combination thereof.

Figure 7:
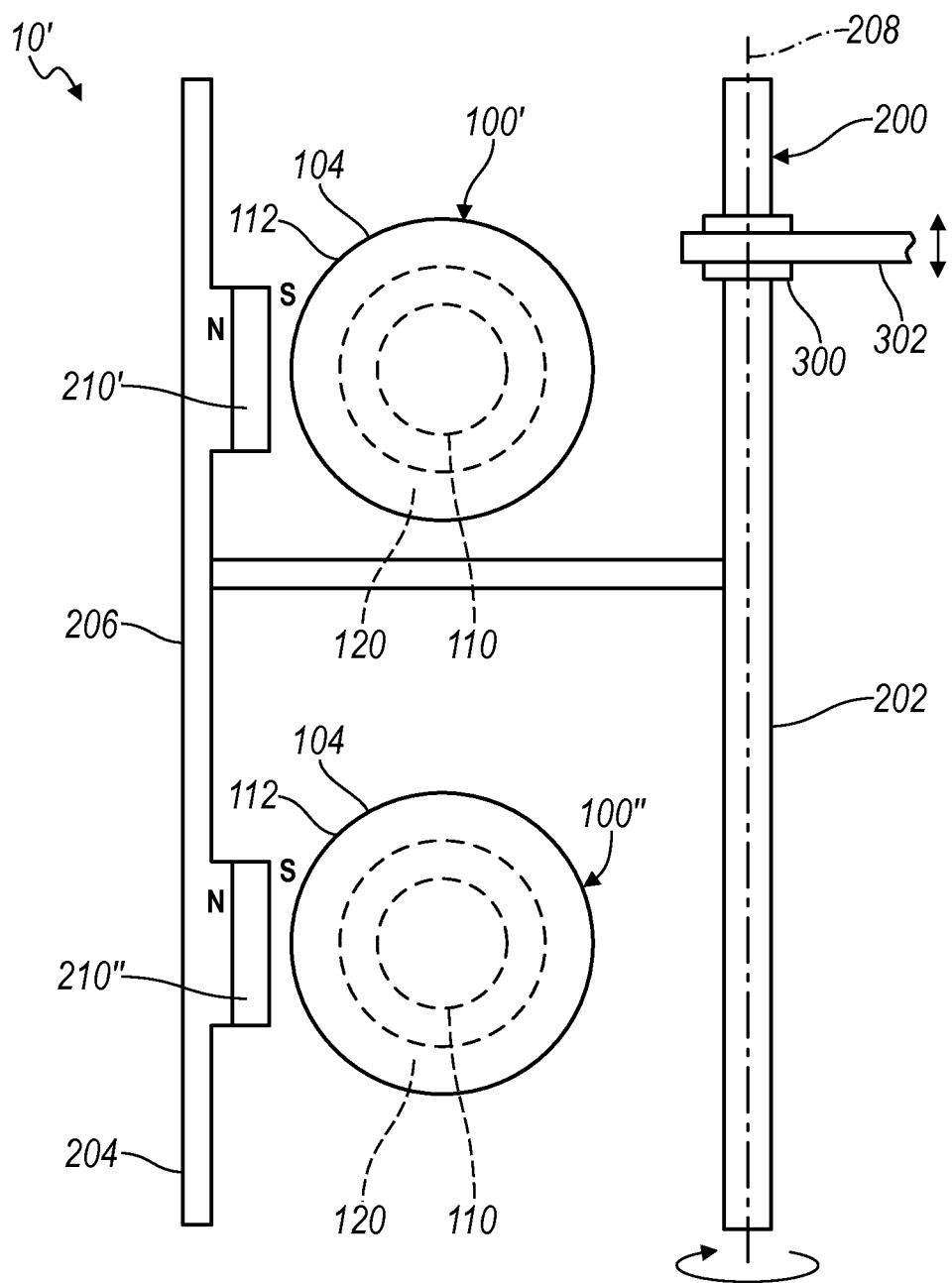
FIG. 7 is a partial sectional view of an alternately configured rotational energy conversion device employing separate linear kinetic energy conversion devices and associated actuating magnets.
Figure 8:
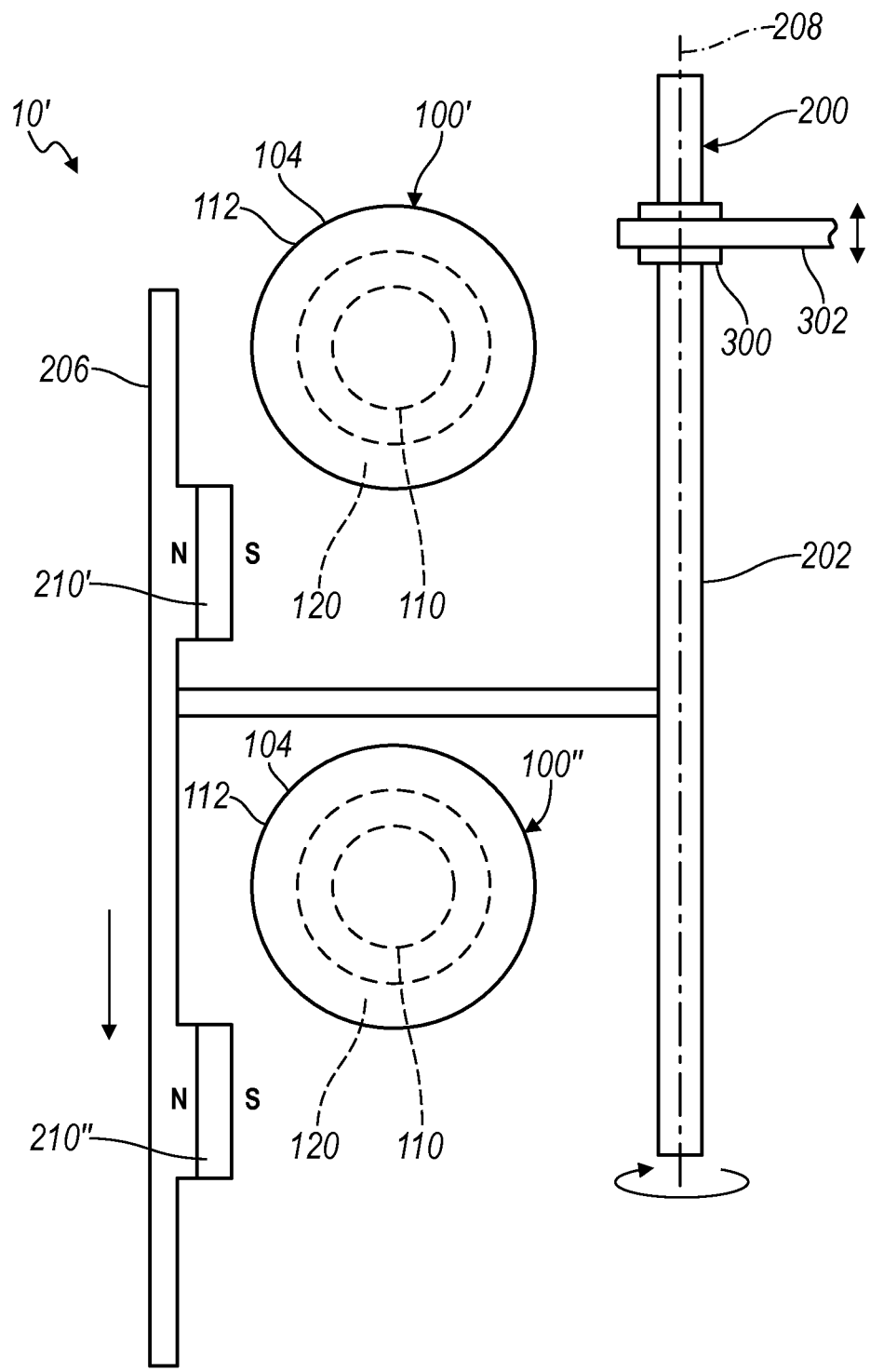
FIG. 8 is a partial sectional view of the alternately configured rotational energy conversion device of FIG. 7, with the actuating magnets positioned at a distance removed from their respective linear kinetic energy conversion device.

An alternative control element may include one or more magnets 210 attached to a slender shaft affixed to the rotor 206. The rotor 206 may include an opening to enable the magnet 210 to be displaced between the 0% output position, for example, as illustrated in FIG. 8, and the 100% output position, for example, as illustrated in FIG. 7. The shaft may be substantially located at a centerline of the magnet's vertical axis. The slender shaft biases the magnet 210 to a neutral position corresponding to the 0% output position.

Figure 13:
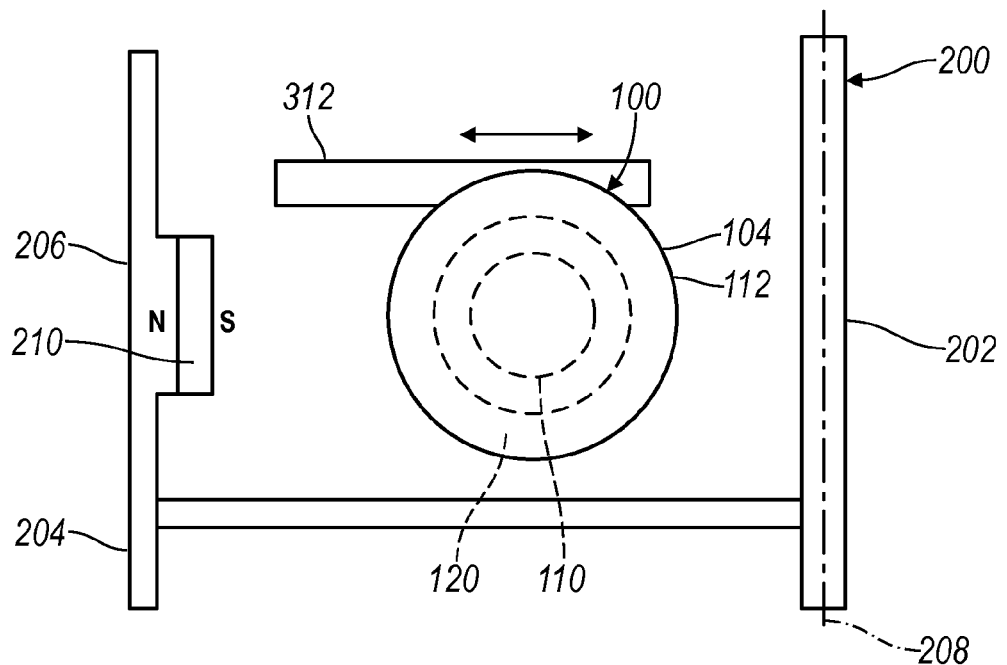
FIG. 13 is a partial sectional view of the rotational kinetic energy conversion with a linear kinetic energy conversion device positionable in a radial direction relative to a shaft and positioned at a distance removed from the actuating magnet.
Figure 14:
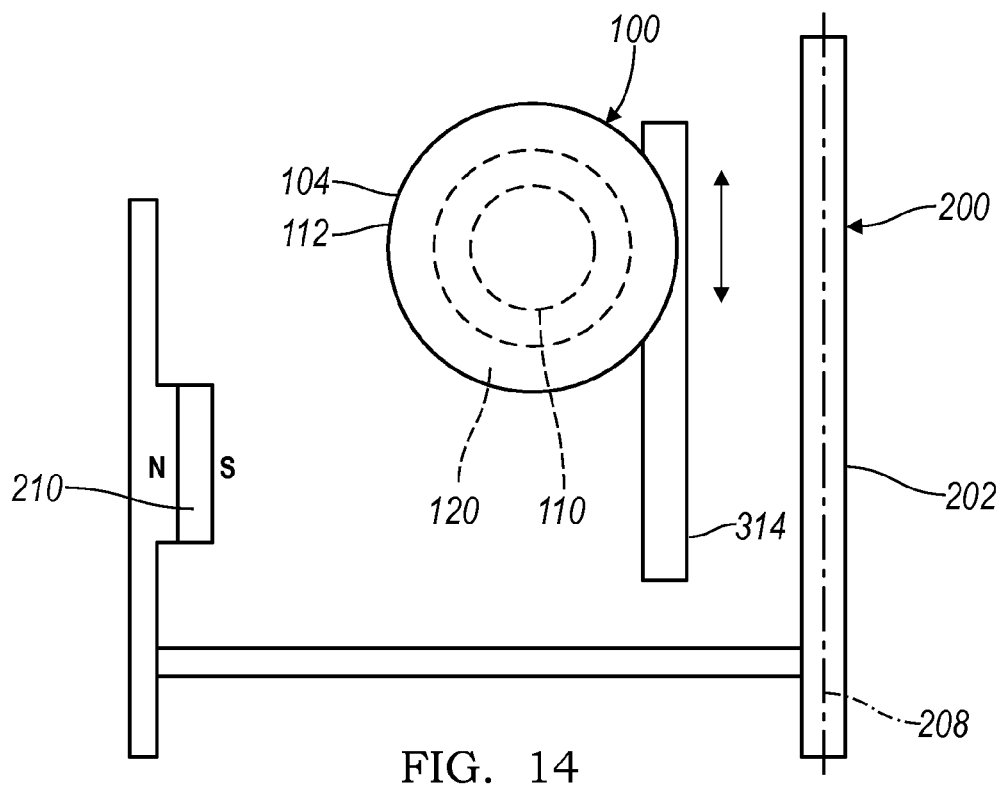
FIG. 14 is a partial sectional view of the rotational kinetic energy conversion with a linear kinetic energy conversion device positionable in an axial direction relative to a shaft and positioned at a distance removed from the actuating magnet.

Other alternative control elements for adjusting the relative position of the actuating magnet 210 and the linear energy conversion device 100 are shown in FIGS. 13 and 14. FIG. 13 depicts a control element 312 in which the linear energy conversion device 100 is moved in a radial direction relative to the rotor 206. FIG. 14 depicts a control element 314 in which the linear energy conversion device is moved in an axial direction relative to the actuating magnet 210. The control element 312, 314 may be controlled hydraulically, pneumatically and electrically actuated, or any combination thereof. The control elements 312, 314 may be a type of linear actuator that interfaces with the linear energy conversion device 100 to create motion in the desired direction. For example, the control element 312, 314 may be a rack and pinion type arrangement in which a linear gear is attached to the linear energy conversion device 100. A pinion meshing with the linear gear may be driven by an electric motor to position the linear energy conversion device in the desired position.

Figure 15:
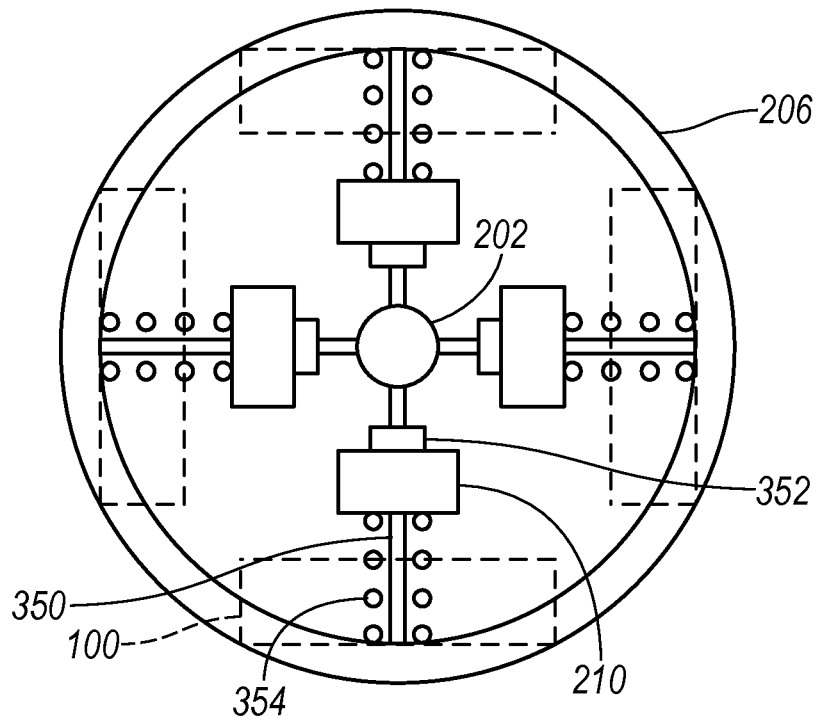
FIG. 15 depicts an example of a rotational kinetic energy conversion system with actuating magnets that move in a radial direction relative to a shaft axis in a rest position.
Figure 16:
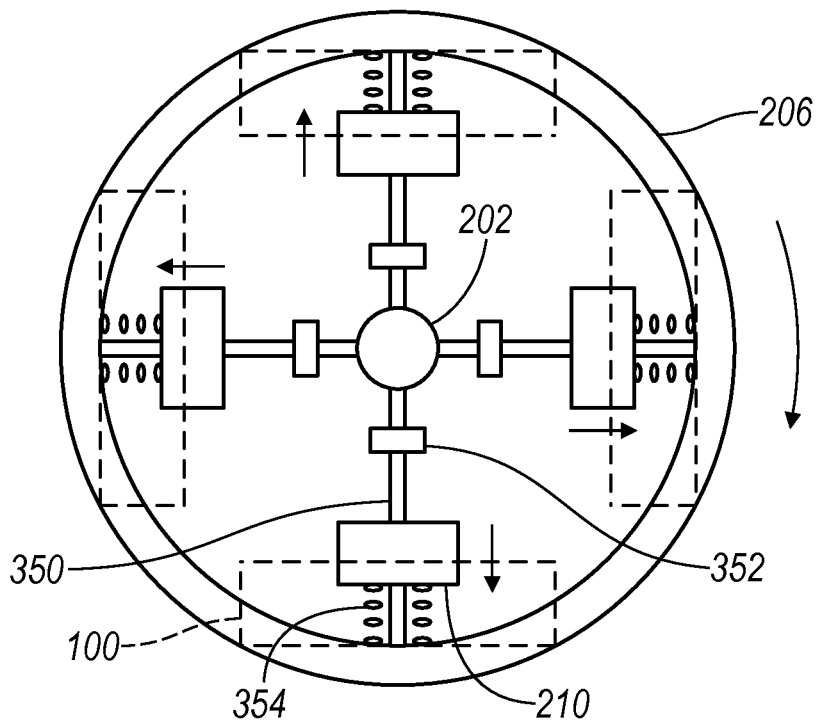
FIG. 16 depicts a rotational an example of a rotational kinetic energy conversion system with actuating magnets that move in a radial direction relative to a shaft axis during rotation of the shaft.

The actuating magnet 210 may also be displaced in a radial direction with respect to the axis 208 of the shaft 202. FIGS. 15 and 16 depict a system in which the actuating magnet 210 is moved radially with respect to the shaft 202. The rotor 206 may be attached to the shaft 202 via spokes 350. Actuating magnets 210 may be slideably mounted to the spokes 350. The actuating magnets 210 may be configured with one or more openings through the body of the actuating magnet 210 that fits around the spoke 350. Alternatively, the openings may fit through rods attached to the spoke 350. A stop mechanism 352 may be attached to the spoke 350 to limit the travel of the actuating magnet 210 in the stopped position. The stop 353 may be attached to the spoke 350 and have a larger diameter than the spoke 350 and the opening. FIG. 15 depicts the case in which the shaft 202 is at rest. At rest, the actuating magnets 210 may lie near the stop 352 of the spoke 350. As the rotational speed of the shaft 202 is increased, centrifugal force acting upon the actuating magnets 210 may cause the actuating magnets 210 to move along the spoke 350 toward the rotor 206. FIG. 16 depicts the case in which the shaft 202 is rotating. The linear energy conversion devices 100 may be fixedly attached to a supporting structure and positioned such that the spacing between the actuating magnets 210 and the linear energy conversion device 100 is reduced as the speed is increased. Such a system may be achieved mechanically by using a spring 354 between the rotor 206 and the actuating magnet 210 as the control element to create a biasing force on the actuating magnet 210. The spring 354 force may be selected to allow a desired amount of actuating magnet 210 travel at a selected speed.

The distance at which magnet 210 is displaced from its neutral position is generally proportional to the rotational speed of the rotor 206, and is directly related to the available input energy, such as may be obtained from wind and hydrodynamic sources, as well as others. Rotating rotor 206 tends to cause the magnet 210 to displace radially outward as the centrifugal force acting on the magnet overcomes the counteracting biasing force applied to the actuating magnet 210. The amount of displacement is directly proportional to the centrifugal force acting on magnet 210, which is a function of $v^2/r$, where "v" is the rotational speed of magnet 210 and "r" is a radial distance from longitudinal axis 208 to the centerline to the magnet 210. The greater the rotational speed, the greater the radial displacement of magnet 210. The centerline of the magnet 210 will generally align with a horizontal centerline of the piston 110 to generate maximum power output from linear energy conversion device 100 at a particular input speed. As the input energy decreases, the biasing force tends to move the magnet 210 away from the 100% output position and toward the neutral 0% output position. Generally, the lower the input energy the smaller the displacement of magnet 210 from the neutral 0% output position. The interaction between magnet 210 and piston 110 creates a braking force that acts on the input shaft. If there is insufficient input energy (for example, wind or hydrodynamic) the shaft speed will decrease and the magnet will move away from the piston centerline as the centrifugal force acting on the magnet 210 is reduced and insufficient to maintain the magnet at the previous (higher rotational speed) position. The positioning of magnet 210 relative to piston 110 may alternatively be hydraulically, pneumatically or electrically controlled, or any combination thereof.

Kinetic energy conversion device 10 may include multiple linear energy conversion devices 100, each interacting with a separate set of actuating magnets 210. For example, FIGS. 7 and 8 illustrate an alternately configured kinetic energy conversion device 10' having a first linear energy conversion device 100' that operably interacts with a first actuating magnet 210', and a second linear energy conversion device 100" that operably interacts with a second actuating magnet 210". Each of the actuating magnets 210' and 210" may be supported on common rotor 206. Positioning of actuating magnets 210' and 210" relative to their respective linear energy conversion devices 100' and 100" may be accomplished by selectively moving rotor 206 axially relative to longitudinal axis 208. Attaching both actuating magnets 210' and 210" to a common rotor 206 enables a single actuating mechanism to be used to control the positioning of both actuating magnets. Positioning actuating magnets 210' and 210" relative to linear energy conversion devices 100' and 100", for example, as shown in FIG. 7, will generally produce the maximum electrical output from the linear energy conversion devices 100' and 100". Repositioning the actuating magnets 210' and 210", for example, to the position illustrated in FIG. 8, by moving rotor 206 downward (as viewed from the perspective of FIGS. 7 and 8) will cause a corresponding reduction in the electrical output from the linear energy conversion devices 100' and 100".

Figure 9:
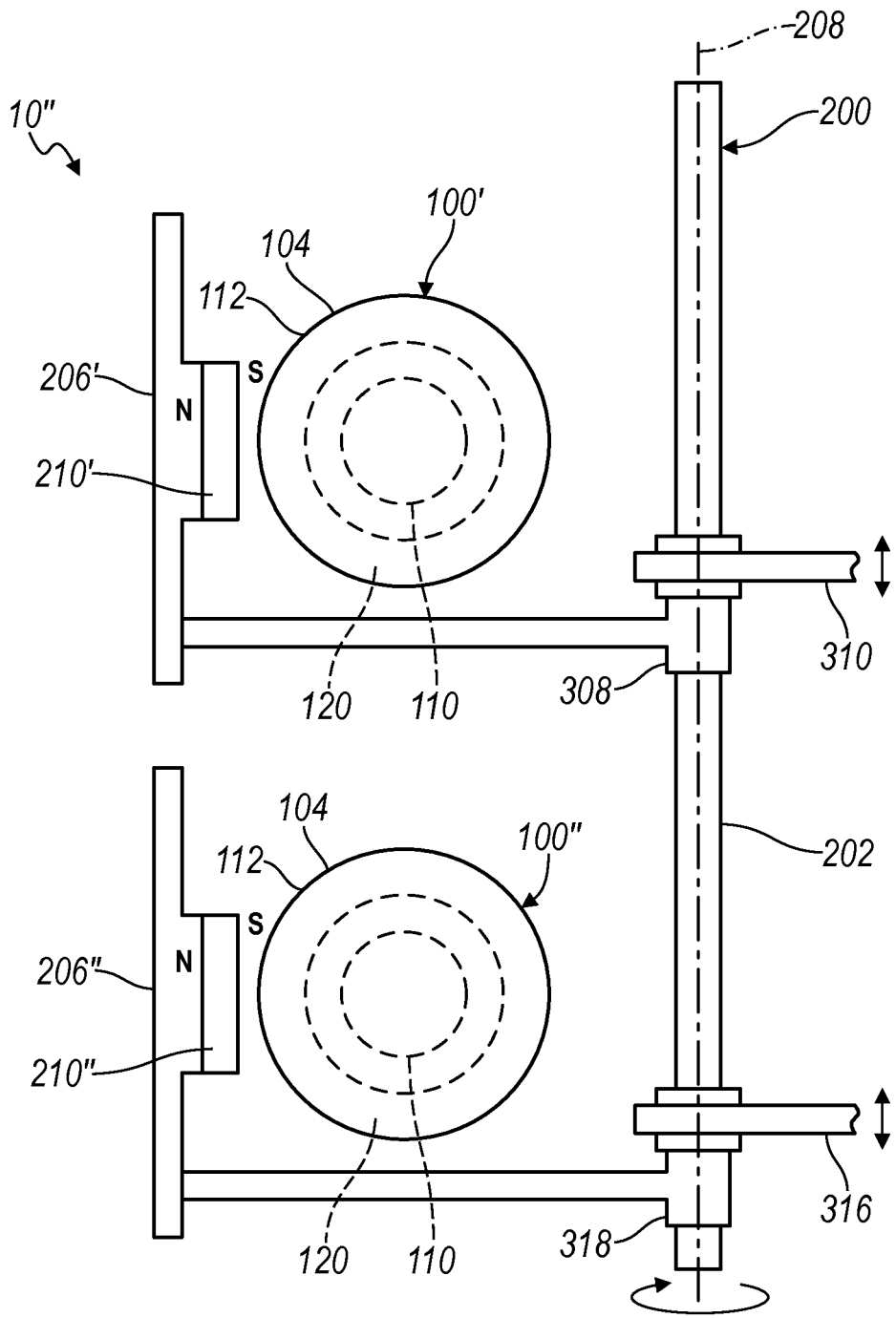
FIG. 9 is a is a partial sectional view of another alternately configured rotational energy conversion device employing separate linear kinetic energy conversion devices and independently positionable actuating magnets.
Figure 10:
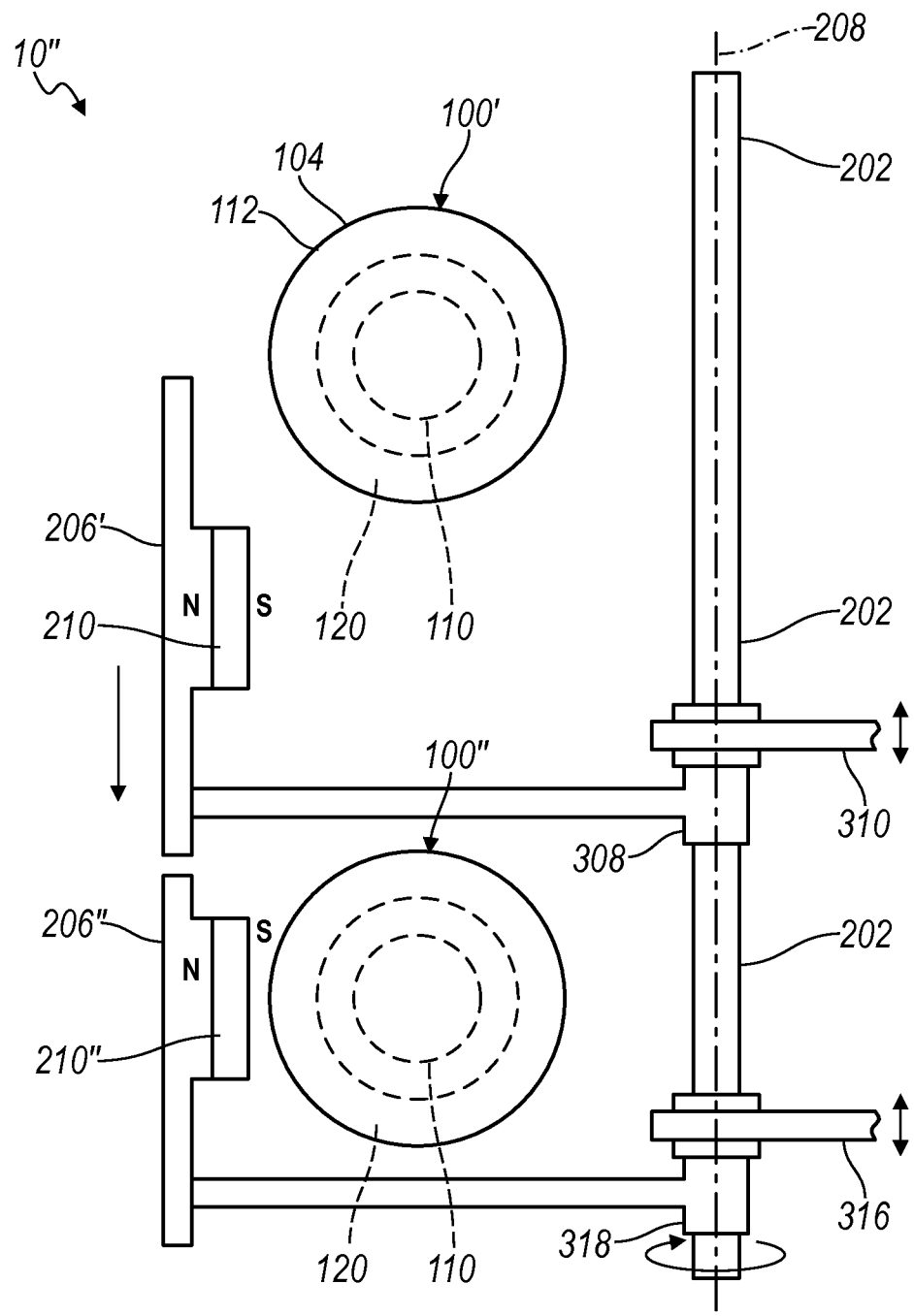
FIG. 10 is a partial sectional view of the alternately configured rotational energy conversion device of FIG. 9, with one of the actuating magnets positioned at a distance removed from its respective linear kinetic energy conversion device.

In the exemplary configuration of kinetic energy conversion device 10' illustrated in FIGS. 7 and 8, the actuating magnets 210' and 210" are shown attached to a common rotor 206. This arrangement does not conveniently allow the actuating magnets to be independently positioned relative to their associated linear energy conversion device. Additional control of the electrical output from the linear energy conversion devices 100' and 100" may be achieved by enabling independent control over the position of each actuating magnet relative to its associated linear energy conversion device. For example, as illustrated in FIGS. 9 and 10, an alternately configured kinetic energy conversion device 10" may include the first linear energy conversion device 100' operatively associated with the first actuating magnet 210', and the second linear energy conversion device 100" operably associated with the second actuating magnet 210". To enable independent control over the positioning of the actuating magnets, actuating magnet 210' is attached to a first rotor 206' and actuating magnet 210" is attached to a second rotor 206". Separate actuating mechanisms may be provided to independently move each of the rotors 206' and 206" to selectively position the associated actuating magnets 210' and 210" relative to their respective linear energy conversion devices 100' and 100". For example, in FIG. 10 actuating magnet 210' is shown moved away from linear energy conversion device 100' while the location of actuating magnet 210" is maintained relative to linear energy conversion device 100".

For example, the rotor 206' may attach to the shaft via a splined hub 308. The splined hub 308 may engage with the shaft 202 and rotate at the same speed as the shaft 202. A shift fork 310 may interact with the splined hub 308 to move the rotor 206' in an axial direction. The rotor 206" may attach to the shaft 202 using another splined hub 318. Axial motion of rotor 206" may be achieved by axial movement of another shift fork 316 that interacts with splined hub 318. The shift forks 310, 316 may be independently operated and controlled such that the spacing between each rotor 206', 206" and associated linear energy conversion device 100', 100" may be independently adjusted. The shift forks 310, 316 may be controlled hydraulically, pneumatically and electrically actuated, or any combination thereof. Note that other configurations are possible and the example provided is but one possible implementation.

Figure 11:
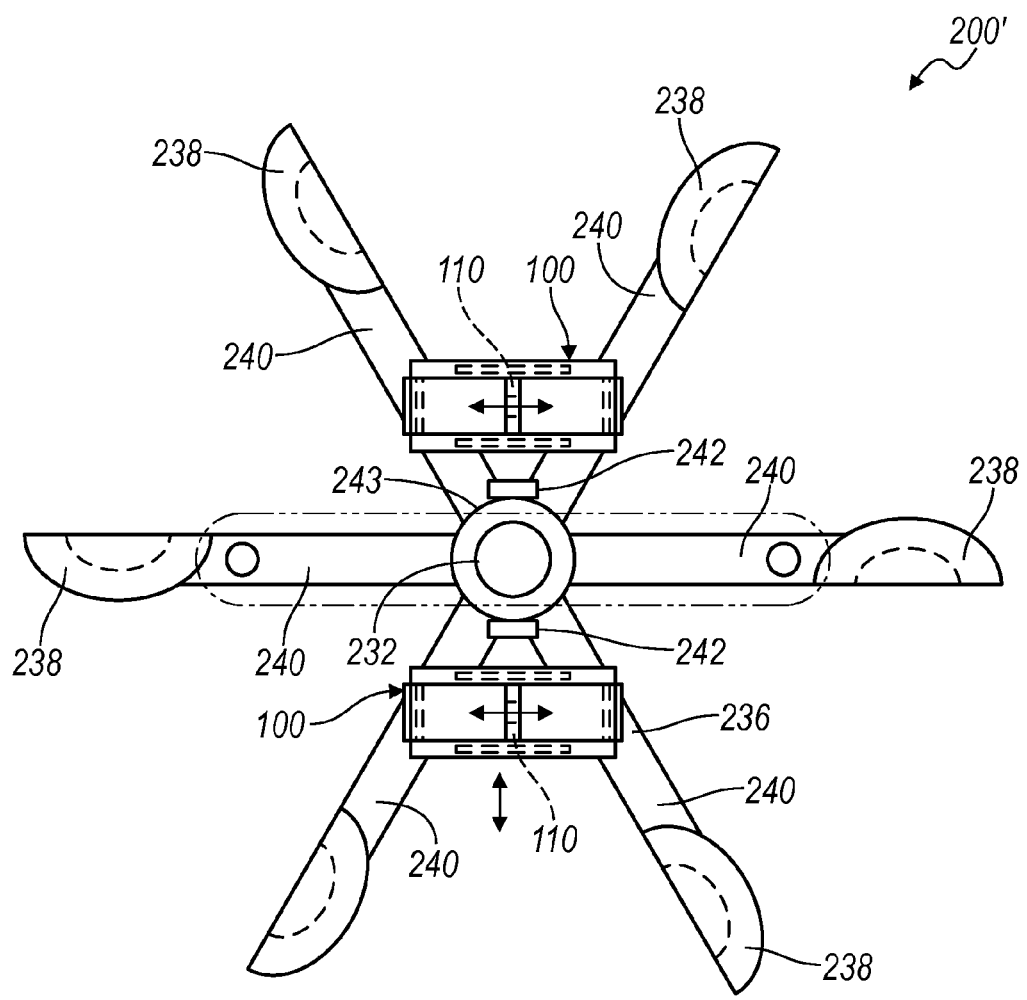
FIG. 11 is another alternative rotational kinetic energy conversion system including a vane style fan and multiple linear kinetic energy conversion devices and employing a variable output control mechanism.

Another alternative exemplary rotational kinetic energy conversion device 200' is illustrated in FIG. 11. Rotational energy conversion device 200' may employ the previously described mechanisms, illustrated in FIGS. 2 and 6-10, for selectively controlling the device's electrical output. Device 200' includes a post 232 mounted in turn to fluid resisting device 238. The device has a rotating frame 236 rotatably mounted to the post 232. The device 200' has a plurality of blades, for example cups 238, mounted on the ends of arms 240 extending radially from the post 232. A pair of linear kinetic energy devices 100 are fixedly mounted to the post 232 adjacent the rotating frame 236 at opposing radial locations about the post. A plurality of actuating magnets 242 are mounted to a rotor 243 so as to cyclically sweep by the linear kinetic energy device 100 and thereby interact with the piston 110 in the linear kinetic energy device 100 in the manner described previously to generate electrical power. The electrical output from rotation energy conversion device 200' may be controlled by selectively moving rotor 243 axially relative to a longitudinal axis of post 232 so as to increase the separation between actuating magnets 242 and linear kinetic energy conversion devices 100.

Figure 12:
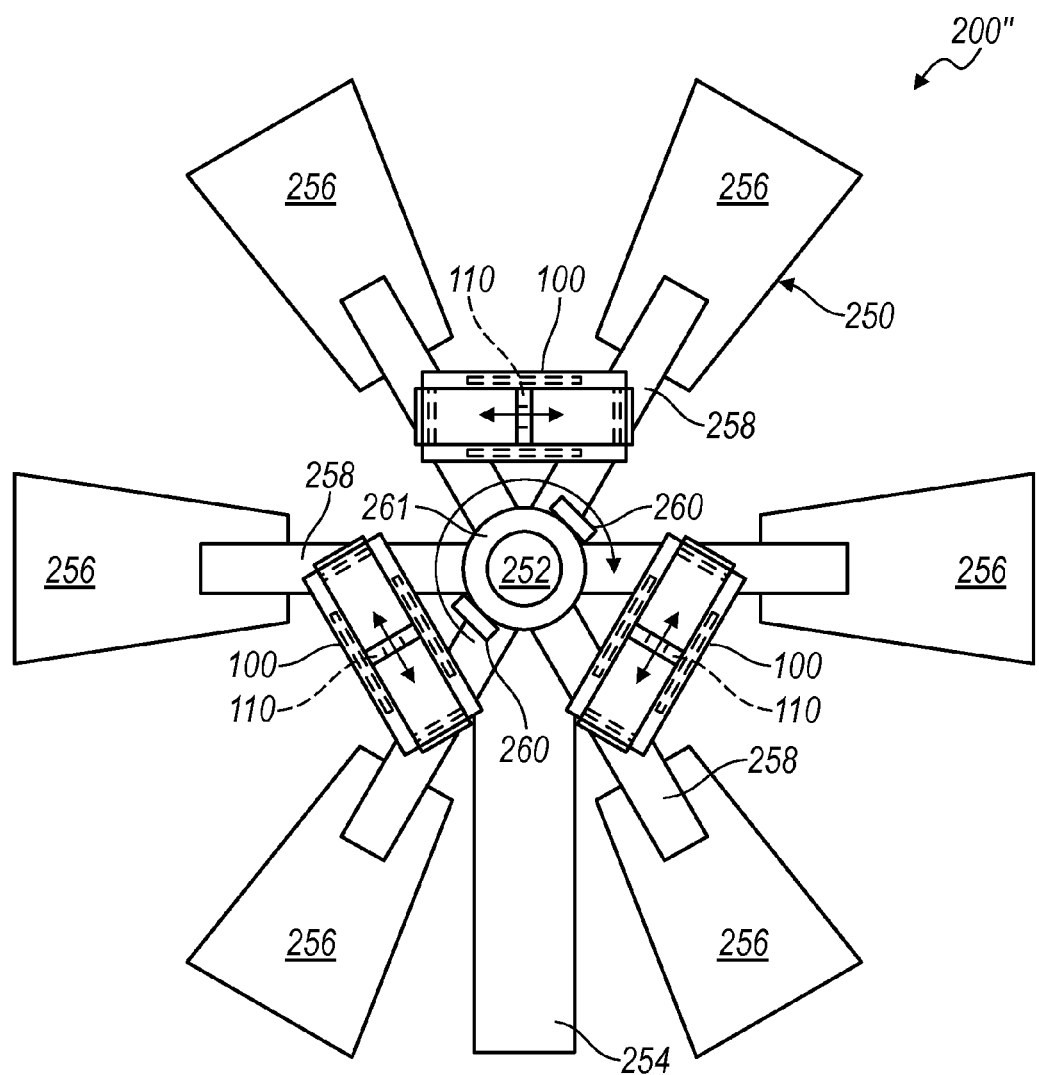
FIG. 12 is a front elevational view of yet another alternative rotational kinetic energy conversion system employing a variable output control mechanism.

Yet another alternative exemplary rotational kinetic energy conversion device 200" is illustrated in FIG. 12. Rotational energy conversion device 200" may employ the previously described mechanisms, illustrated in FIGS. 2 and 6-10, for selectively controlling the device's electrical output. Device 200" comprises a wind resisting vane 250 mounted to an axle 252 extending generally perpendicularly from a vertical post 254, which may be mounted in turn, to the ground. Device 200" has a plurality of blades or vanes 256 mounted on the ends of arms 258 extending radially from the axle 252. The arms 258 may be cylindrical rods. Alternatively, the arms 258 may be shaped to capture a portion of the wind, such as by being shaped as propellers or turbine blades or any airfoil configuration. Three linear kinetic energy devices 100 are fixedly mounted to the post 254 at arcuately spaced locations about the axle 252. A plurality of actuating magnets 260 are mounted to a rotor 261 so as to cyclically sweep by the linear kinetic energy device 100 and thereby interact with the piston 110 in the linear kinetic energy device 100 in the manner described previously to generate electrical power. The electrical output from rotation energy conversion device 200" may be controlled by employing the previously described self-adjusting, centrifugal force driven control device or by selectively moving rotor 261 axially relative to a longitudinal axis of post 254 so as to increase the separation between actuating magnets 260 and linear kinetic energy conversion devices 100.

Additionally, the spoke or shaft mounted actuating magnets may be moved radially as a function of shaft rotational speed thereby increasing the force acting on the magnetic piston as a function of the shaft or actuating magnet rotational speed. The linear energy conversion devices and the actuating magnets may be fixed relative to one another. One or more rotors may be mounted to a common shaft with each rotor having a corresponding bank of one or more linear energy conversion devices fixedly attached and independent of the rotating input shaft that the rotors are attached to. Each rotor may have a corresponding group of one or more linear energy conversion devices fixedly attached to a non-rotating platform. The number of rotors may be determined by power output requirements of the system. It is possible to have as many as twenty or thirty rotors interacting with their corresponding linear energy conversion device groups containing a similar number of fixed groupings of linear energy conversion devices per grouping. This applies when the actuating magnets move radially or axially with respect to the linear energy conversion devices.

Although the diagrams depict the actuating magnet 210 radially positioned at a greater distance from the shaft 202 than the linear energy device 100, the system is not limited to this configuration. The actuating magnet 210 may be positioned at a radial distance that is less than the radial distance of the linear energy device 100. As another alternative, the actuating magnets 210 may be located in a different plane at the same radial distance as the linear energy device 100.

It is to be understood that the described and illustrated invention is not to be limited to the disclosed examples but, on the contrary, is intended to cover various modifications and equivalent arrangements included within the spirit and scope of the disclosure and appended claims which scope is to be accorded the broadest interpretation so as to encompass all such modifications and equivalent structures as is permitted under the law.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An energy conversion system comprising:
   a magnetic piston displaceable along a first path;
   a winding disposed about the first path;
   an actuating magnet cyclically interacting with the magnetic piston based on relative motion of the actuating magnet with respect to the magnetic piston such that the actuating magnet exerts a force on the magnetic piston to oscillate the magnetic piston along the first path to induce an electrical current and voltage in the winding, thereby creating an amount of electrical energy; and
   a control element configured to change a spacing between the magnetic piston and the actuating magnet to vary the force, thereby changing the amount of electrical energy.

2. The energy conversion system of claim 1 wherein the spacing between the magnetic piston and the actuating magnet is a nearest distance between a centerline of the magnetic piston and a centerline of the actuating magnet during relative motion of the actuating magnet with respect to the magnetic piston.

3. The energy conversion system of claim 1 further comprising a rotatable frame that rotates about an axis, wherein the actuating magnet is attached to the rotatable frame and moves in an orbital path about the axis such that the actuating magnet moves relative to the magnetic piston.

4. The energy conversion system of claim 3 wherein the control element moves one of the actuating magnet and the rotatable frame axially with respect to the axis to change the spacing between the magnetic piston and the actuating magnet.

5. The energy conversion system of claim 3 wherein the control element moves one of the magnetic piston and the actuating magnet radially with respect to the axis to change the spacing between the magnetic piston and the actuating magnet.

6. The energy conversion system of claim 3 wherein the control element moves the magnetic piston axially with respect to the axis to change the spacing between the magnetic piston and the actuating magnet.

7. The energy conversion system of claim 1 further comprising a rotatable frame that rotates about an axis, wherein the magnetic piston is attached to the rotatable frame and moves in an orbital path about the axis such that the magnetic piston moves relative to the actuating magnet.

8. The energy conversion system of claim 7 wherein the control element moves the magnetic piston radially with respect to the axis to change the spacing between the magnetic piston and the actuating magnet.

9. The energy conversion system of claim 1 wherein the control element changes the spacing between the magnetic piston and the actuating magnet based on a relative speed of the actuating magnet with respect to the magnetic piston.

10. The energy conversion system of claim 9 wherein, when the relative speed is less than a predetermined value, the spacing is increased as the relative speed decreases.

11. A rotational kinetic energy conversion system comprising:
    a linear energy conversion device;
    a rotatable frame that rotates about an axis;
    an actuating magnet attached to the rotatable frame and rotating in an orbital path to cyclically interact with the linear energy conversion device to cause the linear energy conversion device to create electrical energy; and
    a control element configured to move one of the rotatable frame, the actuating magnet, and the linear energy conversion device to change a spacing between the orbital path and the linear energy conversion device to change an amount of electrical energy created.

12. The rotational kinetic energy conversion system of claim 11 wherein the linear energy conversion device includes a magnetic piston displaceable along a first path and a winding disposed about the first path.

13. The rotational kinetic energy conversion system of claim 11 wherein the control element moves one of the rotatable frame and the actuating magnet axially with respect to the axis to change the spacing between the orbital path and the linear energy conversion device.

14. The rotational kinetic energy conversion system of claim 11 wherein the control element moves the linear energy conversion device axially with respect to the axis to change the spacing between the orbital path and the linear energy conversion device.

15. The rotational kinetic energy conversion system of claim 11 wherein the control element moves one of the linear energy conversion device and the actuating magnet radially with respect to the axis to change the spacing between the orbital path and the linear energy conversion device.

16. The rotational kinetic energy conversion system of claim 11 wherein the control element changes the spacing between the orbital path and the linear energy conversion device based on a rotational speed of the actuating magnet.

17. The rotational kinetic energy conversion system of claim 11 wherein the rotatable frame further includes a plurality of fluid resisting devices such that the rotatable frame is driven to rotate about the axis by motion of a fluid.

18. A method of converting rotational energy into electrical energy comprising:
   driving an actuating magnet to move in an orbital path relative to a magnetic piston to cyclically exert a force on the magnetic piston, thereby inducing an electrical current in a winding disposed about a path of the magnetic piston to create electrical energy; and
   changing a spacing between the orbital path and the magnetic piston to adjust an amount of electrical energy.

19. The method of claim 18 wherein the spacing is increased as a relative speed between the actuating magnet and the magnetic piston decreases.

20. The method of claim 18 wherein the spacing is changed by moving one of actuating magnet and the magnetic piston.

* * * * *